United States Patent
Carney

(10) Patent No.: US 7,203,664 B2
(45) Date of Patent: Apr. 10, 2007

(54) SYSTEM AND METHOD FOR ANNUITY VALUATION

(75) Inventor: Gregory J. Carney, Indianapolis, IN (US)

(73) Assignee: Alliance America Corporation, Indianapolis, IN (US)

( * ) Notice: Subject to any disclaimer, the term of this patent is extended or adjusted under 35 U.S.C. 154(b) by 527 days.

(21) Appl. No.: 10/672,222

(22) Filed: Sep. 26, 2003

(65) Prior Publication Data
US 2005/0071261 A1   Mar. 31, 2005

(51) Int. Cl.
*G06F 17/60* (2006.01)

(52) U.S. Cl. ............................. 705/64; 705/35; 705/36; 705/40

(58) Field of Classification Search .................. 705/35, 705/38, 39, 40, 64
See application file for complete search history.

(56) References Cited

U.S. PATENT DOCUMENTS

| | | | |
|---|---|---|---|
| 4,055,757 A | 10/1977 | Tillman et al. | |
| 4,232,367 A | 11/1980 | Youden et al. | |
| 5,237,500 A | 8/1993 | Perg et al. | |
| 5,631,828 A | 5/1997 | Hagan | |
| 5,644,727 A | 7/1997 | Atkins | |
| 5,893,071 A | 4/1999 | Cooperstein | |
| 5,933,815 A | 8/1999 | Golden | |
| 6,343,272 B1 | 1/2002 | Payne et al. | |
| 2003/0120573 A1* | 6/2003 | Preti et al. | 705/35 |
| 2003/0233301 A1* | 12/2003 | Chen et al. | 705/36 |
| 2004/0172350 A1* | 9/2004 | Atkinson et al. | 705/35 |
| 2005/0060251 A1* | 3/2005 | Schwartz et al. | 705/35 |

FOREIGN PATENT DOCUMENTS

| | | |
|---|---|---|
| EP | 0 709 778 A1 | 5/1996 |
| JP | P2000-259505 A | 9/2000 |
| WO | WO 99/27750 | 6/1999 |
| WO | WO 00/13118 | 3/2000 |
| WO | WO 00/54200 | 9/2000 |
| WO | WO 01/50381 A1 | 7/2001 |
| WO | WO 01/69503 A1 | 9/2001 |

* cited by examiner

*Primary Examiner*—Firmin Backer
(74) *Attorney, Agent, or Firm*—Ice Miller LLP; Dorren J. Gridley; Alexander D. Forman

(57) ABSTRACT

A system and method for annuity valuation. The system of the present invention comprises a processor for execution of the method of the present invention and a data storage device for storage of data related to annuity accounts. The system also comprises an input device for input of variables and parameters related to the method of the present invention. The system may also comprise an output device for transmission of or display of data related to annuity accounts. The method of the present invention comprises the application of different interest (earnings) rates for a plurality of time periods during the term of the account. The present invention operates and in and appropriately reflects changes in increasing, declining, and steady interest rate environments. Annuities offered utilizing the present invention afford the company the opportunity to provide credits for reinvestment. Also, variables of the present invention allow companies to offer a myriad of different annuity products to its customers.

24 Claims, 4 Drawing Sheets

SYSTEM AND METHOD FOR ANNUITY VALUATION

FIELD OF THE INVENTION

The present invention relates to a system and method for annuity valuation, and, in particular to a system and method for applying earnings to annuity accounts.

BACKGROUND OF THE INVENTION

One vehicle used by consumers to build assets for retirement (or otherwise over a long-term basis) are deferred annuity contracts. Traditionally, companies offering such annuity contracts use two methods to determine the account balance to credit interest earnings to the holder of the contract. One such method is known as the Portfolio Method, and the other method is known as the New Money Method.

Under the Portfolio Method, a deposit received by the company in any year of the contract earns the same interest as deposits made in prior or later years. Under the New Money Method, deposits made in a given period receive the new money interest rate. Deposits made in prior or later periods receive the then-current new money rate. Some companies maintain the new money interest indefinitely, while other companies roll the interest into a Portfolio Method rate after some period of time.

There are several shortcomings associated with these traditional earnings methods. First, the use of these methods results in inconsistency within the industry, and do not reflect the current interest rates that the company is earning on such deposits. A portion of the company's portfolio is updated by a combination of scheduled maturities, coupon payments, and called investments. This could allow a company the opportunity to reinvest; however, none of the traditional earnings methodologies captures such reinvestments and credits them to the contract holders.

The Portfolio Method and New Money Method generally work well in either a steady rate environment or a declining interest rate environment. Neither work well, however, in a rising interest rate environment. Specifically, for the Portfolio Method, the portfolio will be below new money interest rates. Such a shortfall means that the company will find it difficult to attract new investments by contract holders or new contract holders. The Portfolio Method account will reflect the old rates being used. For a rising interest rate environment, the New Money Method uses rates that are current for new contracts or new deposits, but the old money rates remain unchanged. Again, this means the company finds it difficult to keep existing customers. In both cases, the contract holders do not receive the benefit of increasing rates to their accounts.

Therefore, it is desired to provide a system and method for calculating credits to an annuity contract that works in environments of steady, decreasing, and increasing interest rates. It is also desired to provide a method for determining earnings for annuity contracts that provides credits for reinvestment of investments experienced by the company holding such contracts.

A system and method for annuity valuation should also provide for numerous variants. In this manner, a company has flexibility in the annuity products it offers, and different companies can distinguish their products from each other. It is therefore desired to provide a system and method for annuity valuation having flexibility in the type of annuity product offered.

SUMMARY OF THE INVENTION

The system and method of the present invention provide a means for valuation of financial accounts, such as annuity accounts. In one embodiment of the system of the present invention, the system comprises a processor for execution of the valuated method of the present invention. The valuation method of the present determines earnings according to the relationship $$E_t = (P - (t-1)A)i_1 + \sum_{n=2}^{t} A i_n$$

where P is the premium deposited in the account, A is the amount to be subject to the earnings in a particular time period (A is less than P), t is the number of the particular time period, and $i_n$ is the interest (earnings) rate for the time period designated by t. There must be a least two time periods established within the term of the account.

The system and method of the present invention are applicable in declining, steady, and increasing interest rate environments. The invention also allows an account holder the opportunity to benefit from investments made using the funds in the account. The present invention also provides a myriad of options for companies offering products using the method of the present invention.

DETAILED DESCRIPTION OF THE INVENTION

Figure 1:
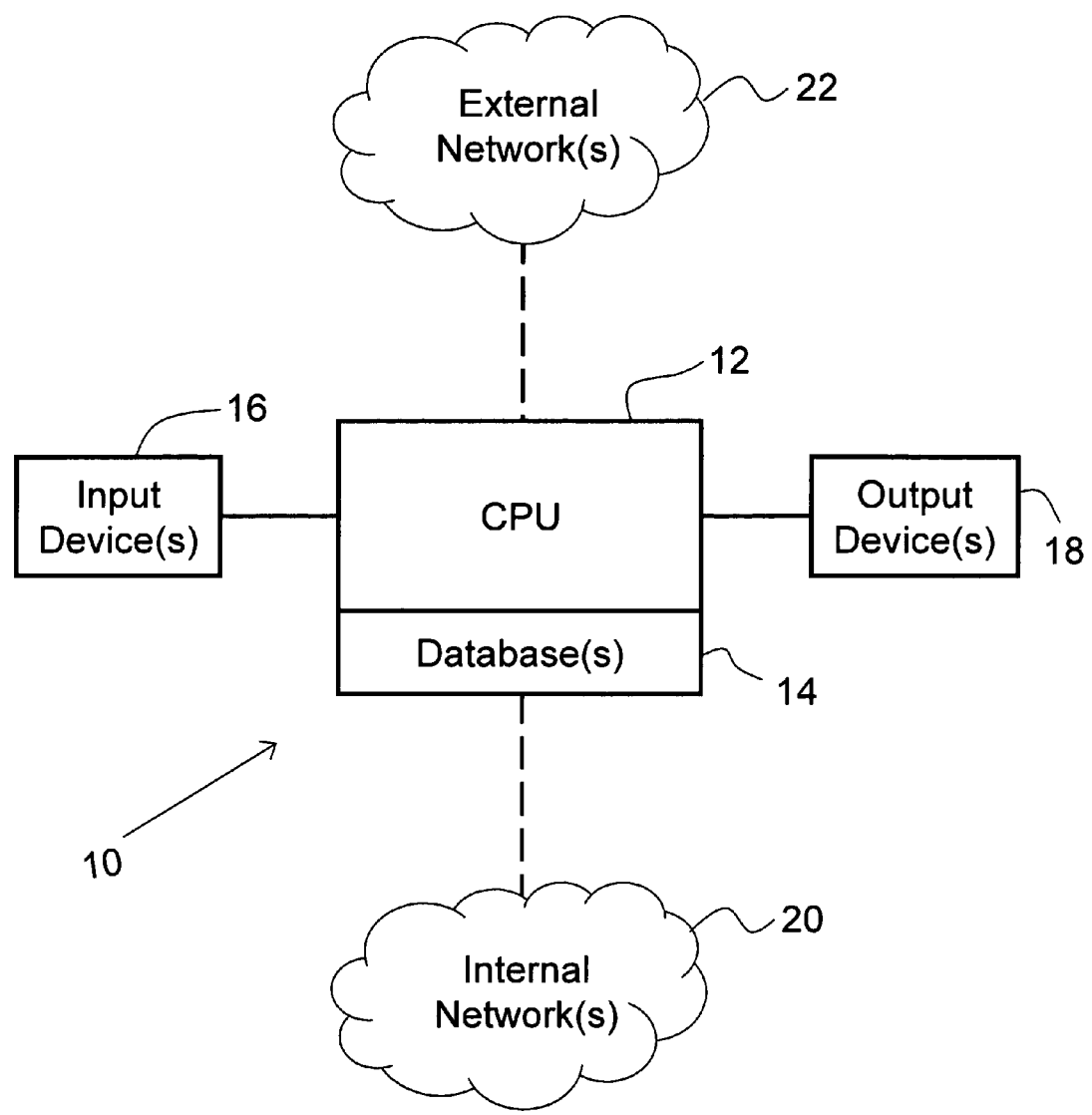
FIG. 1 shows a block diagram of one embodiment of the system of the present invention.

Referring now to FIG. 1, there is shown a block diagram of one embodiment of system of the present invention. In this embodiment, system 10 comprises central processing unit ("CPU") 12, database(s) 14, input device(s) 16, output device(s) 18, internal network 20, and external network 22. CPU 12 comprises a personal computer, or other processor or combination of processors. CPU 12 operates on code (in hardware and/or software form) for execution of the method of the present invention. Database(s) 14 are associated with CPU 12, and may housed within the same housing as CPU 12 or operatively connected thereto in a manner well-known in the art. Database(s) 14 is(are) used to store information required for execution of the method of the present invention. Input device(s) 16 is(are) used to communicate with a user and/or input parameters, variables, and account type information and individual account information for communication with CPU 12. Input device(s) 16 may comprise a keyboard, mouse, touch screen, and/or connection to another CPU, for example. Output device(s) 18 may comprise a printer, display monitor, and/or connection to another device, and is(are) used for communication with a user and/or to output data about the system, the types of accounts, and the individual accounts from CPU 12.

In this embodiment, CPU 12 is operatively connected to internal network 20 and external network 22. Such connection is by wire, wireless, fiber optic cable, or other communications mechanisms well-known in the art. CPU 12 communicates with internal network 20 and external network 22 by protocols well-known in the art, such as Ethernet or USB. The connection of CPU 12 to internal network 20 and external network 22 allow information stored in database(s) 14 to be accessed from a myriad of local and remote locations by users permitted to have access to system 10. For example, internal network 20 may be desirable to allow a plurality of users within a company to access system 10 for establishment, maintenance, and report generation from system 10. External network 22 may be desirable to allow remote company users to access system 10 in a manner similar to that access available through internal network 20, and/or to allow prospective and/or current annuity holders (i.e., prospective and/or current individuals desiring to have or having a financial account for which the method of the present invention is applied) to access information about the types of accounts provided by the company or an account holder's own account.

It will be appreciated by those of skill in the art that numerous variations of the system 10 are possible and within the scope of the invention. For example, system 10 may not include internal network 20 and/or external network 22. While database(s) 14 are illustrated to be directly connected to CPU 12, each of database(s) 14 may be remotely located from CPU 12 and operatively connected thereto. Further, input device(s) 16 and output device(s) 18 may be remotely located from CPU 12.

Figure 2:
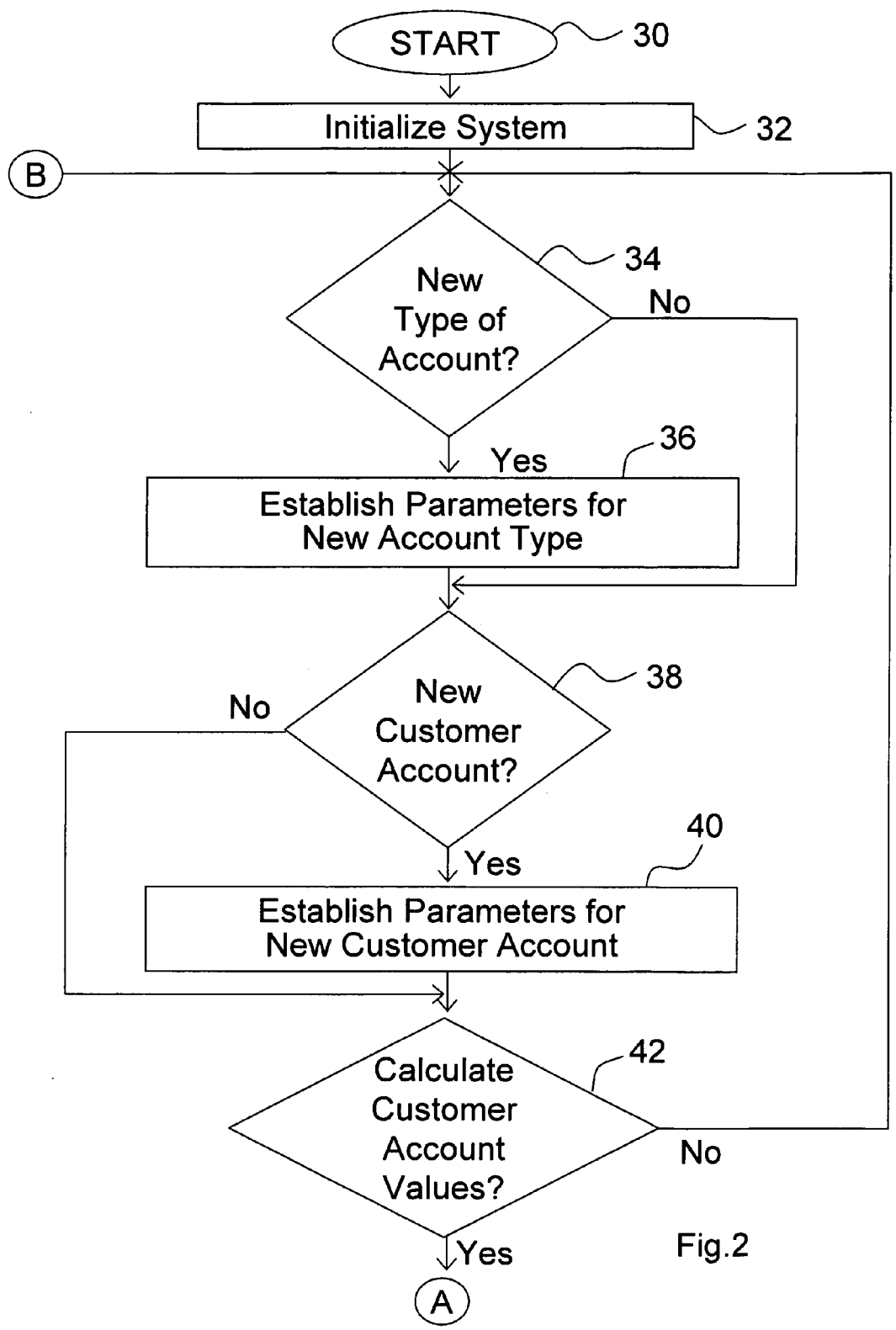
FIG. 2 shows a flow chart of one embodiment of initialization for the method of the present invention.

FIG. 2 shows a flow chart of one embodiment of initialization for the method of the present invention. In start step 30, CPU 12 is powered up. At step 32, system 10 is initialized. Such initialization at step 32 includes initialization of the code executing on CPU 12. System 10 then inquires as to whether a new type of account is to be established on system 10 at step 34. A new type of account is one which likely corresponds to a new product to be offered by the company, but for which the basic parameters, such as term of the account, and the amount of premium to be applied using the method of the present invention, have not been entered. The term "amount of premium" generally means a percentage of the premium, or a fixed monetary amount.

If a new account type is to be established, system 10 proceeds to step 36 where the parameters for the new account are established. To establish the parameters, input device(s) 16 of system 10 are used. If a new account is not to be established, system 10 proceeds to step 38.

At step 38, system 10 inquires as to whether a new customer account is to be established. If a new customer account is to be established, system 10 proceeds to step 40 where the parameters of the new individual account are established at step 40. Such establishment generally occurs through input device(s) 16. Parameters required for a new customer account include a designation of the type of account, the amount of premium (initial and/or other premiums), and the term of the account. Of course, data regarding the particular customer, such as name, address, and personal identification number, are also established at step 40. If no new customer account is to be established, system 10 proceeds to step 42.

At step 42, system 10 inquires as to whether the value of customer accounts in system 10 are to be calculated. If no such calculation is to take place, system 10 returns to step 34. If calculations are to be made, system 10 proceeds to A (see FIGS. 3 and 4).

Figure 3:
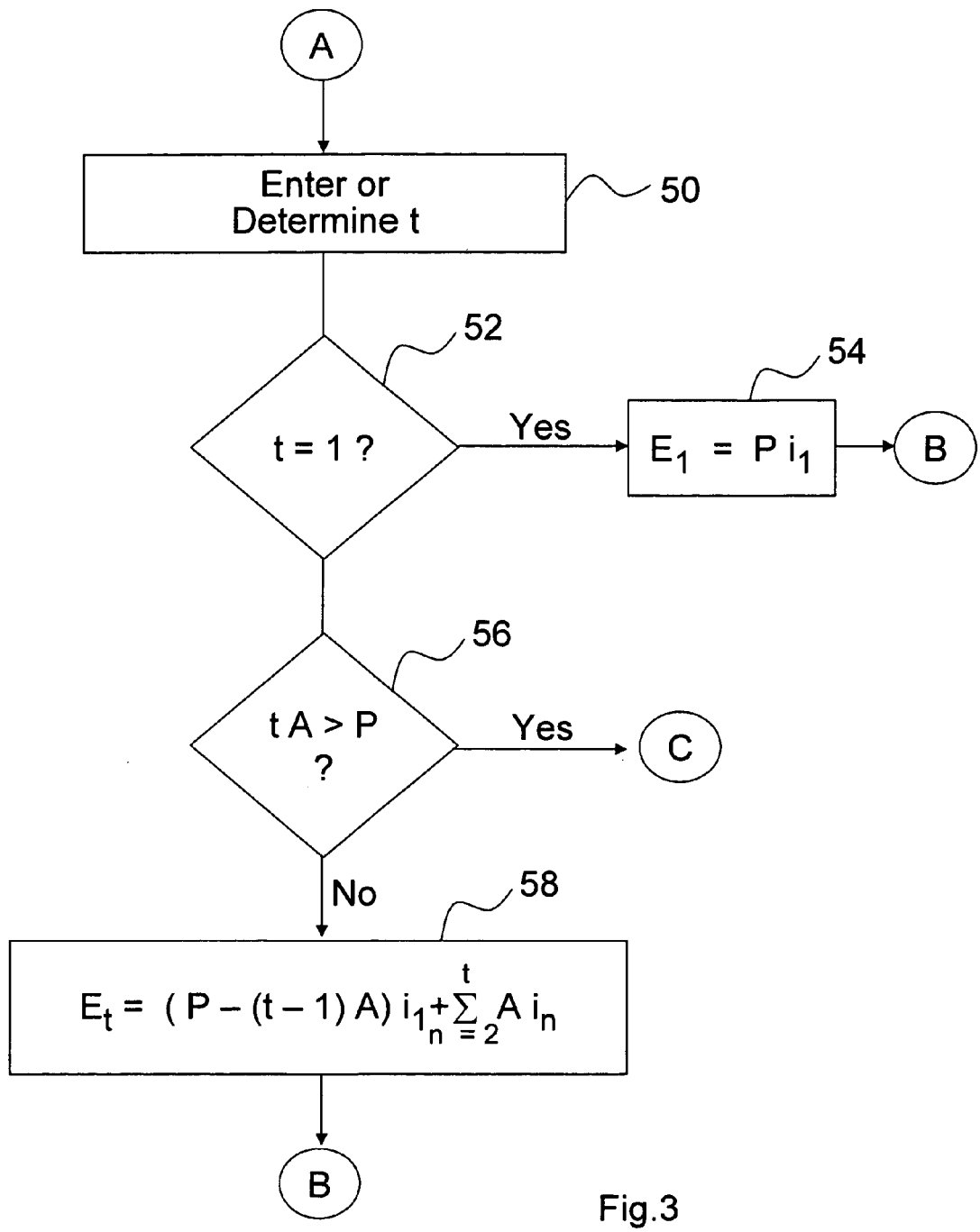
FIG. 3 shows a flow chart of one embodiment of the valuation method of the present invention.
Figure 4:
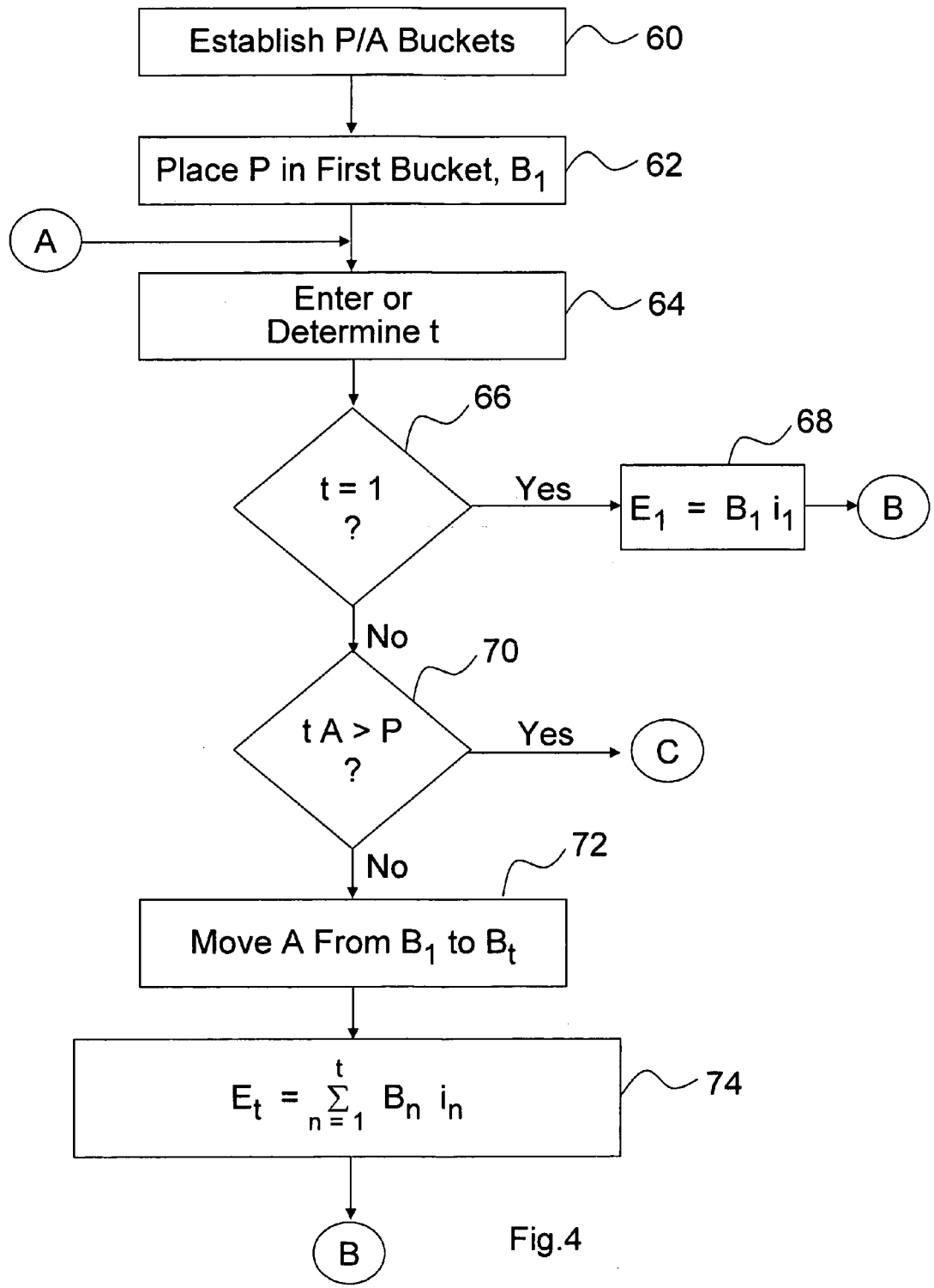
FIG. 4 shows a flow chart of a second embodiment of the valuation method of the present invention.

FIGS. 3 and 4 show flow charts of alternate embodiments of the valuation method of the present invention. In the embodiment of FIG. 3, calculation of earnings for an account are calculated at a discrete time, whereas in FIG. 4, the earnings calculation is made based on placement of the premium in a plurality of "funds" or "buckets". Regardless of whether the methods illustrated in FIG. 3 or FIG. 4 are used, the earnings calculation for any particular time period and cumulative time periods are the same.

The variables identified in FIG. 3 and FIG. 4 are defined as follows. "t" means the number of a specific time period. Each time period is a period of time upon which earnings are calculated. There should be at least two time periods for the term of the account, but it is not necessary for the term of the account to correspond to the total time over which the method of the present invention is to be applied to the account. The period of time over which the method is applied is referred to herein as the "initial term". Each time period may be one (1) year, one (1) quarter year, one (1) semi-annual period, or one (1) months, for example. It is possible that the time period corresponding to t=1 may be different from the remaining time periods, i.e., t>1. For example, a company may wish to fix the interest for a one (1) year period and then determine earnings according to the present method for every quarter thereafter. The value of the time periods is one of the parameters established for an account type as indicated in step 36 of FIG. 2.

"A" is the monetary amount of the premium "P" to be subject to the different interest (earnings) rates for each time period. "A" may be determined as a percentage of the premium "P" or a monetary amount, for example. The value of "A" for each time period is assumed in FIG. 3 and FIG. 4 to be the same for each time period; however, the invention does contemplate differing values of A for different time periods. As with the value of the time periods, the value(s) of "A" are established in step 36 of FIG. 2.

As to the remaining variables, the term "$i_t$" is used to designate the interest (earnings) rate for the time period "t". "$E_t$" is the earnings for time period "t". "$B_t$" is the amount in a bucket "B" for a particular time period "t". A bucket "B" is a virtual fund or a holding place for the amount for a particular time period "t".

Referring now to FIG. 3, after initialization has occurred, such as illustrated in FIG. 2, to determine the earnings for a particular individual (customer) account, the first step is the entry or determination of time period "t" in step 50. System 10 then inquires as to whether "t" is the first time period, i.e., whether t=1, in step 52. If t=1, then the earnings for the first time period $E_1$ is calculated to be $Pi_1$ in step 54.

If it is determined in step 52 that t≠1, then system 10 proceeds to step 56. In step 56, system 10 determines whether the quantity tA>P. If tA>P, then the initial time frame for application of the method of the present invention to the account (the "initial term") has been reached and system 10 proceeds to C as is explained in greater detail herein. If tA≦P, then the earnings for the account through time period "t" is determined by the relationship:

$$E_t = (P - (t-1)A)i_1 + \sum_{n=2}^{t} A i_n$$

Once earning is calculated for a customer account, for all customer accounts of a particular account type, or for all customer accounts for all account types, as desired by an operator of system 10, according to the procedure set forth in FIG. 3 (See B of FIG. 3), system 10 returns to step 34 as shown in FIG. 2. If the initial term of an account has been reached (See C of FIG. 3), one of the alternatives for handling the account after the initial term is described in greater detail herein. Of course, system 10 may also send earnings data to one or more of output device(s) 18, such as for display, printing, or transmission of the data.

It may be useful to follow the earnings of an account for the first four years according to the method of the present invention:

$$E_1 = P, i,$$

$$E_2 = Ai_2 + (P-A)i,$$

$$E_3 = Ai_3 + Ai_2 + (P-2A)i,$$

$$E_4 = Ai_4 + Ai_3 + Ai_2 + (P-3A)i,$$

Referring now to FIG. 4, there is shown an alternate embodiment of the valuation method of the present invention. As previously stated, in this embodiment, "buckets" or "funds" are established within an account to hold the premium and earnings established for that account. Each bucket corresponds to a time period of the initial term of the account. Steps 60 and 62 are initialization steps that may be included in step 40 of FIG. 2, for the establishment of P/A buckets in step 60 and the placement of premium P in the first bucket, $B_1$, in step 62 only needs to be done when the customer account is established.

At step 64, the specific number of the time periods is entered or determined by system 10. At step 66, system 10 determines whether t=1. If t=1, system 10 proceeds to step 68 to determine the earnings for the first time period according to the relationship $E_1 = B_1 i_1$. If t≠1, then system 10 proceeds to step 70.

System 10 determines whether the initial term of the account is complete in step 70. Specifically, in step 70, system 10 determines whether tA>P. If tA>P, then the initial term is complete and system 10 handles the account according to C as is described in greater detail herein.

If tA≦P, then system 10 proceeds to step 72. In step 72, an amount equal to A is moved from $B_1$ to $B_t$. In step 74, earnings are calculated according to the relationship:

$$E_t = \sum_{n=1}^{t} B_n i_n$$

With regard to operation of the system of the present invention for performance of the method of the present invention, code comprising software and/or hardware operates on CPU 12 to perform the comparisons and calculate the relationships as set forth above. If virtual funds or buckets are used as illustrated in FIG. 4, database(s) 14 includes data (amounts, interest rates, and time periods) for each bucket of each individual account.

The company providing the annuity product may determine what happens when the quantity tA>P, i.e., what happens for C as illustrated in FIG. 3 or FIG. 4. One option is to continue the present method for the ensuing time periods. Another option may be to apply a fixed interest rate for the remainder of the term of the annuity account. Yet another option may be the application of a different method for determining earnings on the annuity account for a specified time period thereafter. Such other methods may comprise the Portfolio Method or New Money Method, for example.

While the present invention has been described with regard to a single or initial annuity premium, it will be appreciated by those of skill in the art that the method of the present invention is applicable to a financial account having one or more deposits or premiums therefor. The method of the present invention could be applied, for example, to each deposit based on the date of each such deposit. Alternately, the method could be applied cumulatively to the deposits made during the term of the account. Further, the method of the present invention could be applied only to the initial premium while another method for valuation is applied to subsequent deposits. These, and other alternatives, are contemplated to be within the scope of the present invention.

According to the method of the present invention, interest (earnings) rates for each time period do not have to be determined at the time the account is opened. To do so would require the company offering the product to anticipate future interest rates. Instead, the interest rates for each time period are determined dynamically throughout the term of the account. In this manner, the interest rates for each period will reflect market rates and/or the results of investments made by the company with the monetary value held in such accounts.

It will be appreciated by those of skill in the art that numerous alternatives exist for the system of the present invention. For example, such as is illustrated in FIG. 4, a company may actually create "funds" or "buckets" for retention of the amounts due for a particular time period, and therefore the data storage means of the system would necessarily include a data storage mechanism for retaining such "funds" or "buckets".

It will also be appreciated that the system and method of the present invention may be applied for financial accounts other than an annuity account. Specifically, the present invention may be used with insurance policies, bank products including certificates of deposit, reversionary annuities, or any other interest-bearing account offered by financial institutions.

It will be further appreciated that the method of the present invention provides the company offering annuity products with a variety of options. As previously mentioned, the company may select whether to apply a percentage or monetary amount of premiums to be subject to the method of the present invention. The company also may select any particular percentage or monetary amount. In addition, the company has flexibility as to what method will be used for determining account value after the quantity tA>P. Further, the company may delay application of the method of the present invention for any period of time after deposit of the initial premium. Such variations permit the company or companies with annuity products to offer various options to its customers.

It will be still further appreciated that the present invention operates in and appropriately reflects interest rates regardless of whether the interest rate environment is increasing, declining, or steady. In this manner, the company providing the annuity will not be required to pay interest rates higher than the interest rate environment when the interest rates are declining. Also, an annuity holder will receive increasing interest rates in an increasing interest rate environment.

It will be yet further appreciated that the present invention allows companies to provide credits for reinvestment to its annuity holders. Such credits can be reflected in the interest rate offered for a particular time period.

Having described the present invention in terms of its various embodiments and as illustrated by the accompanying figures, it will be recognized by those skilled in the art that certain changes can be made to the specific embodiments discussed herein without changing the manner in which the components or steps of the present invention function or achieve their intended result. All such changes are intended to fall within the spirit and scope of the following claims.

I claim:

1. A system, comprising:
    at least one processor for execution of a specified valuation method;
    at least one database associated with the processor; and
    a financial account, the account having term and having a plurality of time periods associated therewith, with the plurality of time periods cumulatively less than or equal to the specified term, and the account having a premium deposited therein;
    wherein the specified valuation method executed by the at least one processor uses the relationship $$E_t = (P - (t-1)A)i_1 + \sum_{n=2}^{t} A i_n$$

provided that $tA \leq P$, and where P is the premium, t is the number corresponding to the number of one of the plurality of time periods, A is an amount less than P, and $i_t$ is the interest rate for the time period designated as t.

2. The system of claim 1, further comprising at least one input device operatively connected to at the at least one processor.

3. The system of claim 1, further comprising at least one output device operatively connected to the at least one processor.

4. The system of claim 1, further comprising:
    an internal network operatively connected to the at least one processor.

5. The system of claim 1, further comprising:
    an external network operatively connected to the at least one processor.

6. The system of claim 1, wherein the at least one database contains data about the account, including the amount of the premium, the amount A, the term of the account, and the length of the time periods.

7. A method for financial account valuation, the method comprising the steps of:
    establishing an account, the account having a specified term and having a plurality of time periods associated therewith, with the plurality of time periods cumulatively less than or equal to the specified term;
    establishing an interest rate for each of the plurality of time periods;
    depositing a least one premium into the account;
    calculating earnings at a time corresponding to one of the plurality of time periods, $E_t$, according to the relationship $$E_t = (P - (t-1)A)i_1 + \sum_{n=2}^{t} A i_n$$

provided that $tA \leq P$, and where P is the premium, t is the number corresponding to the number of one of the plurality of time periods, A is amount less than P, and $i_t$ is the interest rate for the time period designated as t.

8. The method of claim 7, further comprising the step of: determining A as a percent of the premium P.

9. The method of claim 7, further comprising the step of: determining A as a fixed, monetary amount.

10. The method of claim 7, wherein the term of the account is equal to the cumulative time for the plurality of time periods such that earnings are calculated according to the calculating step throughout the term of the account.

11. The method of claim 7, wherein the interest rates for each of the plurality of time periods reflects then-current market rates.

12. The method of claim 7, wherein the interest rates for each of the plurality of time periods reflects the earnings on investments made with the account.

13. A method for financial account valuation, the method comprising the steps of:
    establishing an account, the account having term and having a first and second time period, wherein the sum of the first and second time periods is less than or equal to the term of the account;
    depositing a premium P into the account and establishing an amount A less than the premium;
    establishing a first interest rate, $i_1$, for the first time period;
    determining earnings for the first time period as $E_1 = P i_1$;
    establishing a second interest rate, $i_2$, for the second time period; and
    determining earnings for the second time period as $E_2 = A i_2 + (P-A) i_1$.

14. The method of claim 13, wherein the account further comprises a third time period, and wherein the sum of the first, second, and third time periods is less than or equal to the term of the account, the method further comprising the steps of:
    establishing a third interest rate, $i_3$, for the third time period; and
    determining earnings for the third time period as $E_3 = A i_3 + A i_2 + (P-2A) i_1$.

15. The method of claim 13, wherein at least one of the first or second interest rates reflects a then-current market rate.

16. The method of claim 13, wherein at least one of the first or second interest rates reflects then-current earnings made with the account.

17. A method for financial account valuation, the method comprising the steps of:
    (a) establishing an account, the account having a specified term and having a plurality of time periods associated therewith, with the plurality of time periods cumulatively less than or equal to the specified term;
    (b) depositing a premium P in the account;
    (c) specifying an amount A less than the premium;
    (d) establishing an interest rate for the first of the plurality of time periods;
    (e) determining earnings for the account at the conclusion of the first of the plurality of time periods as $E_1 = P i_1$, where i1 is the interest rate for the first of the plurality of time periods, and P is the premium;

(f) establishing an interest rate for the next of the plurality of time periods;

(g) determining earnings for the next of the plurality of time periods, $E_t$, using the relationship $$E_t = (P - (t-1)A)i_1 + \sum_{n=2}^{t} A i_n$$

where t designated the number of the next time period, and $i_n$ is the interest rate for the time period n.

18. The method and claim 17, further comprising the step of:

(h) repeating steps (f) and (g) until tA>P.

19. The method of claim 18, further comprising the step of:

(i) establishing earnings for the remainder of the term of the account using a fixed interest rate.

20. The method of claim 18, further comprising the step of:

(i) establishing earnings for the remainder of the term of the account by repeating steps (f), (g), and (h).

21. The method of claim 18, further comprising the step of:

(i) establishing earnings for the remainder of the term of the account using an earnings method from the group consisting of a portfolio method and a new money method.

22. A method for financial account valuation, the method comprising the steps of:

(a) establishing an account the account having a specified term and having a plurality of time periods associated therewith, with the plurality of time periods cumulatively less than or equal to the specified term;

(b) depositing a premium P in the account;

(c) specifying an amount A less than the premium;

(d) establishing a plurality of funds for the account, the total number of funds, t, equal to P/A;

(e) placing premium P in the first of the plurality of funds;

(f) establishing a first interest rate, $i_1$, for the first of the plurality of time periods;

(g) determining earnings for the first of the plurality of time periods by the relationship $E_1 = F_1 i_1$, where $F_1$ is the first of the plurality of funds;

(h) establishing an interest rate for the next of the plurality of time periods;

(i) moving an amount A from $F_1$ to the fund for that particular next time period, $F_t$; and (j) determining earnings for the next of the plurality of time periods by the relationship $$E_t = \sum_{n=1}^{t} F_n i_n$$

where $F_n$ is the fund for time period n and $i_n$ is the interest rate for time period n.

23. The method of claim 22, further comprising the step of:

(k) repeating steps (h), (i), and (j) until tA>P.

24. A system, comprising:

at least one processor for execution of a valuation method according to the method of claims 7, 13, 17, or 22.

* * * * *